(12) United States Patent
El Hajj et al.

(10) Patent No.: US 10,754,792 B2
(45) Date of Patent: Aug. 25, 2020

(54) PERSISTENT VIRTUAL ADDRESS SPACES

(71) Applicant: Hewlett Packard Enterprise Development LP, Houston, TX (US)

(72) Inventors: Izzat El Hajj, Urbana, IL (US); Alexander Merritt, Palo Alto, CA (US); Gerd Zellweger, Zurrich (CH); Dejan S. Milojicic, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/774,233

(22) PCT Filed: Jan. 29, 2016

(86) PCT No.: PCT/US2016/015661
§ 371 (c)(1),
(2) Date: May 7, 2018

(87) PCT Pub. No.: WO2017/131747
PCT Pub. Date: Aug. 3, 2017

(65) Prior Publication Data
US 2018/0322067 A1    Nov. 8, 2018

(51) Int. Cl.
*G06F 12/109*    (2016.01)
*G06F 9/448*    (2018.01)
*G06F 12/02*    (2006.01)

(52) U.S. Cl.
CPC .......... *G06F 12/109* (2013.01); *G06F 9/4493* (2018.02); *G06F 12/0238* (2013.01);
(Continued)

(58) Field of Classification Search
CPC .. G06F 12/109; G06F 12/023; G06F 12/0238; G06F 2212/1016;
(Continued)

(56) References Cited

U.S. PATENT DOCUMENTS 6,301,582 B1    10/2001    Johnson et al.
6,681,239 B1    1/2004    Munroe et al.
(Continued)

FOREIGN PATENT DOCUMENTS

WO    WO-2015114644        8/2015
WO    WO-2015156830        10/2015
WO    WO-2017044124 A1    3/2017

OTHER PUBLICATIONS

Volos, H., Tack, A.J. and M.M. Swift, "Mnemosyne: Lightweight Persistent Memory," ASPLOS'11, Mar. 2011.*
(Continued)

*Primary Examiner* — Tracy A Warren
(74) *Attorney, Agent, or Firm* — Brooks, Ameron & Huebsch, PLLC

(57) ABSTRACT

Example implementations relate to persistent virtual address spaces. In one example, persistent virtual address spaces can employ a non-transitory processor readable medium including instructions to receive a whole data structure of a virtual address space (VAS) associated with a process, where the whole data structure includes data and metadata of the VAS, and store the data and the metadata of the VAS in a non-volatile memory to form a persistent VAS (PVAS).

14 Claims, 6 Drawing Sheets

(52) U.S. Cl.
CPC ............... *G06F 2212/1016* (2013.01); *G06F 2212/1032* (2013.01); *G06F 2212/502* (2013.01); *G06F 2212/657* (2013.01); *G06F 2212/7202* (2013.01); *G06F 2212/7207* (2013.01)

(58) Field of Classification Search
CPC ....... G06F 2212/1032; G06F 2212/502; G06F 2212/657; G06F 2212/7202; G06F 2212/7207
See application file for complete search history.

(56) References Cited

U.S. PATENT DOCUMENTS

| | | | | |
|---|---|---|---|---|
| 6,854,115 | B1* | 2/2005 | Traversat | G06F 11/203 711/113 |
| 7,058,785 | B1 | 6/2006 | Ochotta | |
| 7,669,020 | B1* | 2/2010 | Shah | G06F 11/1458 711/162 |
| 9,733,980 | B1* | 8/2017 | Khan | G06F 9/4856 |
| 9,912,752 | B1* | 3/2018 | Davis | H04L 67/1097 |
| 2004/0148360 | A1 | 7/2004 | Mehra et al. | |
| 2006/0143443 | A1* | 6/2006 | Cohen | G06F 11/1448 713/158 |
| 2007/0204100 | A1 | 8/2007 | Shin et al. | |
| 2012/0005412 | A1 | 1/2012 | Ware | |
| 2013/0031296 | A1 | 1/2013 | Na | |
| 2014/0059284 | A1* | 2/2014 | Fang | G06F 12/02 711/104 |
| 2014/0304542 | A1* | 10/2014 | Rogers | G06F 1/28 713/340 |
| 2015/0178097 | A1* | 6/2015 | Russinovich | G06F 9/4418 713/2 |
| 2016/0110291 | A1* | 4/2016 | Gordon | G06F 12/126 711/6 |
| 2017/0185324 | A1* | 6/2017 | Hack | G06F 3/0619 |

OTHER PUBLICATIONS

Sartakov, V.A. and R. Kapitza, "NV-Hypervisor: Hypervisor-based Persistence for Virtual Machines," 44th Annual IEEE/IFIP International Conference on Dependable Systems and Networks, 2014.*

Li, X., Lu, K., Wang, X. and X. Zhou, "NV-process: A Fault-Tolerant Process Model Based on Non-Volatile Memory," APSys'12, Jul. 2012.*

International Searching Authority, The International Search Report and the Written Opinion, PCT/US2016/015661, dated Nov. 10, 2016, 12 Pgs.

Palnati, S.R. et al., "Persistent Storage for 64-Bit Systems", Retrieved on Feb. 3, 2016, 6 pages https://www.google.co.in/url?sa=t&rct=j&q=&esrc=s&source=web&cd=3&ved=0ahUKEwjPzcuwl87KAhWUCo4KHeNcDk0QFggmMAI&url=https%3A%2F%2Fwww.iitg.ernet.in%2Fgb%2Fpapers%2Fpersist_cit.doc&usg=AFQjCNGuWTqaKkUa-1M5jaXFpveFepBUmA&bvm=bv.113034660.d.c2E&cad=rja.

Litzkow, M. et al., "Supporting Checkpointing and Process Migration Outside the UNIX Kernel," 1992, USENIX Winter Conference, pp. 1-8.

Lin, L. et al., "Checkpointing and Rollback-recovery in Distributed Object Based Systems," 1990, IEEE, 20th International Symposium, pp. 97-104.

Tevanian, A., Jr et al., "A UNIX Interface for Shared Memory and Memory Mapped Files Under Mach," 1987, USENIX Summer, pp. 1-17.

Wang, Yi-Min et al., "Checkpointing and Its Applications," Proc. IEEE Fault-Tolerant Computing Symp. (FTCS-25), Jun. 1995, pp. 22-31.

* cited by examiner

PERSISTENT VIRTUAL ADDRESS SPACES

BACKGROUND

Computing devices such as laptop computers, desktop computers, tablets, servers, and/or other types of computing devices may include a virtual memory system. In a virtual memory system, each process of the computing device may be provided a virtual address space (VAS). The address space for each process is virtual because the computing system may not actually include enough physical memory for every processes' address space to be loaded into physical memory at the same time.

DETAILED DESCRIPTION

Devices with a virtual memory system may allow a process to include a virtual address space (VAS). However, a VAS may not persist or otherwise be maintained beyond execution of the process and/or may not persist beyond (i.e., following) powering off of the device.

Accordingly, examples of the disclosure relate to persistent virtual address spaces. As used herein, a persistent virtual address space refers to data and metadata that is maintained in non-volatile memory beyond execution of a process and beyond powering off of a device including the non-volatile memory. In an example, persistent virtual address spaces can employ a non-transitory processor readable medium including instructions to a whole data structure of a VAS associated with a process, where the whole data structure includes data and metadata of the VAS, and store the data and the metadata of the VAS in a non-volatile memory to form a persistent VAS (PVAS). Desirably, PVASs can be maintained in non-volatile memory to promote readily associating the PVASs with processes, as detailed herein.

Figure 1:
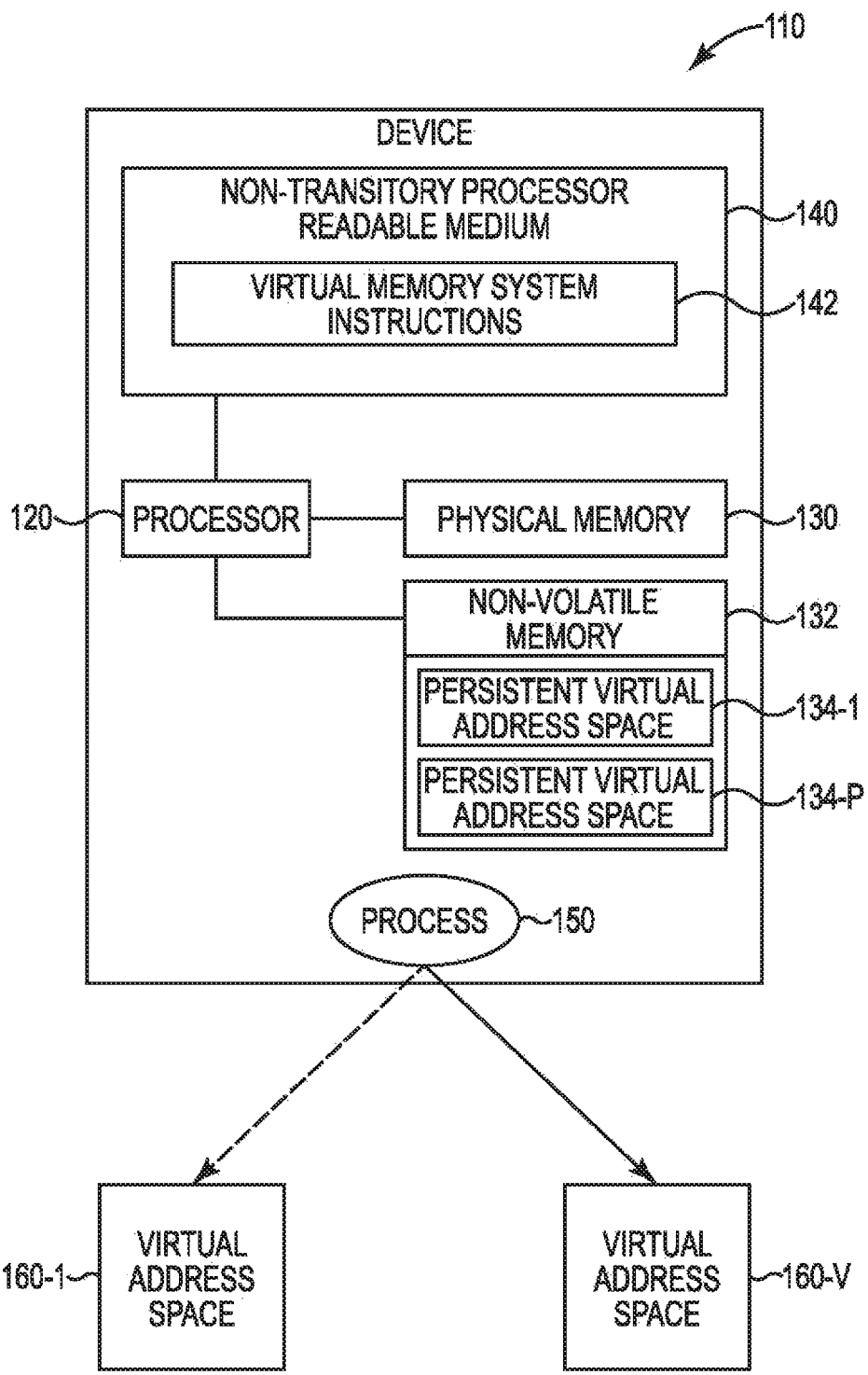
FIG. 1 is a block diagram of an example of a device that may utilize persistent virtual address spaces (PVAS)s according to the disclosure.

FIG. 1 is a block diagram of an example of a device that may utilize PVASs according to the disclosure. As illustrated in FIG. 1, a device 110 can include a processor 120, a physical memory 130, a non-volatile memory 132 including PVASs 134-1, . . . , 134-P, and a non-transitory processor readable medium 140.

The device 110 may be a computing device, such as a server computer, a desktop computer, a laptop computer, a tablet, a smartwatch, and/or a smartphone, among other suitable devices to promote PVASs. The processor 120 can refer to a central processing unit (CPU), graphics processing unit (CPU), an application specific integrated circuit (ASIC), and/or another type of processor to promote PVASs. The physical memory 130 can refer to dynamic random access memory (DRAM), static random access memory (SRAM), non-volatile random access memory (NVRAM), phase change memory, and/or another suitable form of physical memory to promote PVASs. The physical memory 130 can store processor executable instructions and data. The physical memory 130 can be separate and distinct from the non-volatile memory 132 and/or can be formed of at least in part of the non-volatile memory 132, among other possibilities.

The non-volatile memory 132 can refer to memory that does not depend upon power to store information such as metadata and/or data. Examples of non-volatile memory can include solid state media such as flash memory, electrically erasable programmable read-only memory (EEPROM), phase change random access memory (PCRAM), resistive memory such as memristors, as well as other types of machine-readable media.

As mentioned, the non-volatile memory 132 includes PVASs 134-1, . . . , 134-P. While illustrated as including two PVASs the disclosure is not so limited. Rather, a total number of the PVASs can be varied to include more or less PVASs through adding, deleting, and/or combining PVASs, among other possibilities.

The PVASs 134-1, . . . , 134-P can each be formed of respective data and metadata that respectively represent each PVASs of the PVASs 134-1, . . . , 134-P. Stated another way, each respective PVAS has respective data and respective metadata that is representative thereof. A PVAS can be formed of data and metadata of a whole data structure of a VAS, Notably, storing a whole data structure of a VAS, as compared to other approaches that do not persist a whole data structure, can provide accelerated reboots of the device 110 and/or provide comparatively decreased latency during operation of device 110 such as when attempting to reuse metadata (e.g., existing address mappings to pages and/or objects) stored in the non-volatile memory 132. In some examples, metadata stored in the non-volatile memory 132 can include objects at a sub-page size in contrast to other approaches employing process check pointing, object check pointing, and/or memory mapped files that may not be able to readily recognize, store, and/or employ individual sub-page sized objects.

A whole data structure can include pages (e.g., data and memory resources), translation structures (e.g., access metadata), data, and description information such as meta-metadata (e.g., which processor, address space size, endian, etc.). In some examples, a whole data structure can include functions. The functions can be stored as instructions in a persistent virtual address space, as loadable code in the persistent virtual address space, and/or indirectly as pointers (e.g., pointers directing elsewhere within a persistent virtual address space), among other possibilities. As described herein, the processor 120 can cause receipt and storage of data and metadata of a whole data structure of a VAS to form a PVAS. The PVAS can be maintained (e.g., maintained in a manner suitable to promote reuse thereof) in the non-volatile memory in response to powering off a device.

In some examples, a PVAS can be included in a plurality of PVASs. For instance each of the plurality of PVASs can include a respective whole data structure of a VAS that remains in the non-volatile memory across a system boot. A system boot can include powering off and powering on a device. As mentioned, a total number of the plurality of PVASs can be varied through addition, deletion, and/or combination of the plurality of PVASs, among other possibilities.

For instance, in some examples, the device 110 can include instructions to delete a PVAS. A PVAS of the plurality of PVASs can be deleted in response to the PVAS reaching a predetermined threshold time (e.g., a number of days, a number of reboot cycles, etc.) and/or in response to a user input (e.g., a command to delete the PVAS), among other possibilities.

In some examples, a PVAS of a plurality of PVASs can be combined with another PVAS of the plurality of PVASs. An example method of combining PVASs is described herein with respect to FIG. 6.

Figure 2:
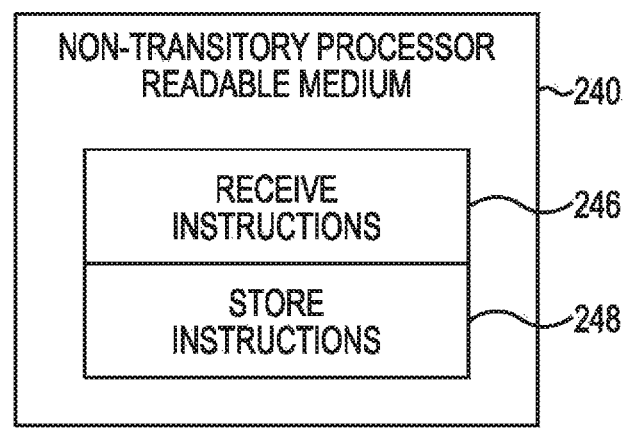
FIG. 2 illustrates an example of a non-transitory processor readable medium according to the disclosure.

The non-transitory processor readable medium 140, as detailed with respect to FIG. 2, can include instructions, which when executed by the processor 120 or other processor can cause the processor to implement aspects of the examples described herein. For example, the non-transitory processor readable medium 140 may include virtual memory system instructions 142. The virtual memory system 142 can abstract the physical memory 130 of the device 110 from processes running on the device 110. For example, each process running on the device can be provided with a respective virtual address space. The respective virtual address spaces can be sized according to various constraints of the virtual memory system 142, among other possibilities. In some examples, each process can utilize virtual address space in a manner that the process may not be aware of (e.g., aware of a size of) the physical memory 130 included in the device 110.

In operation, a process 150 executes on the device 110. That is, a process (e.g., a virtual machine) refers to instructions and/or data that can exist within a virtual address space and are executable by a processor to complete a task. For example, a database program running on the device 110 may be comprised of a number of processes. A process can run under control of an operating system and/or other type of controller such as a hypervisor.

As mentioned, the virtual memory system 142 can include a plurality of virtual address spaces 160-1, . . . , 160-V. While illustrated as including two virtual address spaces the disclosure is not so limited. Rather, a total number of the virtual address spaces can be varied to include more or less virtual address spaces. A process 150 can be associated with VAS such as the first VAS 160-1. A VAS can be used by the virtual memory system instruction 142 to make it appear to the process 150 that a full address space of the device 110 is available to the process, even though the device 110 may not be equipped with enough physical memory for the process's entire VAS to be loaded into physical memory.

FIG. 2 illustrates an example of a non-transitory processor readable medium 240 according to the disclosure. As mentioned, the non-transitory processor readable medium 240 includes instructions executable by a processor to perform a number of functions described herein.

The non-transitory processor readable medium 240 can be internal and/or external to the device (e.g., the device can include non-transitory processor readable medium and/or have access to an external non-transitory processor readable medium). The instructions (e.g., machine-readable instructions (MRI)) can include instructions stored on the PRM to implement a particular function. The set of MRI can be executable by a processor (e.g., processor 120 described with respect of FIG. 1). The non-transitory processor readable medium 240 can be coupled to the device in a wired and/or wireless manner. For example, the non-transitory processor readable medium 240 can be an internal memory, a portable memory, a portable disk, and/or a memory associated with another resource (e.g., enabling MRI to be transferred and/or executed across a network such as the Internet).

Non-transitory processor readable medium 240 can include volatile and/or non-volatile memory, Volatile memory can include memory that depends upon power to store information, such as various types of dynamic random access memory (DRAM) among others. Non-volatile memory can include memory that does not depend upon power to store information.

As illustrated in FIG. 2, the non-transitory processor readable medium 240 can include instructions such as receive instructions 246 and store instructions 248. Notably, such instructions can promote formation along with other aspects of PVASs, as described herein.

A whole data structure, as described herein, includes data and metadata along with other information of a VAS such as a VAS associated with a process. In some examples, the receive instructions 246 can include instructions to receive metadata that includes virtual address mappings of a process to a page and/or an object and/or other information to promote PVASs. Put another way, the receive instructions can receive data such data corresponding to a page and/or data corresponding to an object to promote PVASs. It is noted that PVASs, as described herein, can be formed and utilized in a variety of applications and/or operating system implementations including those that employ objects and those that do not employ objects.

The store instructions 248 can, in various examples, store the data and the metadata of the process, received by the receive instructions 246, in a non-volatile memory to form a PVAS. In various examples, the stored data and the stored metadata can be from a process associated with a VAS.

The non-transitory processor readable medium 240 can include instructions to disassociate a process from the VAS, as described herein. In some examples, the store instruction 248 can include instructions to maintain a PVAS in non-volatile memory in response to disassociation of the VAS from the process. Dissociation of a VAS from a process can occur when a process ends (i.e., is no longer executing on a processor) and/or in response to an input (e.g., a user input) dissociating the VAS from a process, among other possibilities. A PVAS can be associated with a process (e.g., a process from which it was dissociated from or a different process), as described herein.

A PVAS can be maintained in the non-volatile memory in response to powering off a device (i.e., a device power-off) that includes the non-volatile memory. That is, a PVAS can be maintained in response to device power-off, a device system restart, a device power-on, and/or a device resume (e.g., resuming from a sleep state such as an Advanced Configuration and Power Interface ACPI sleep state S3, S4, etc.), among other possibilities. In some examples, PVAS can be maintained in the non-volatile memory in response to disassociation of the VAS from the process and in response to powering off a device.

In some examples, the store instructions 248 can further include instructions to mark data and metadata stored in the non-volatile memory in a read-only format to form the PVAS. However the disclosure is not so limited. Rather, in some examples data, metadata, and/or other information included in a whole data structure can be stored in part or as a whole in a readable format to form a PVAS.

Figure 3:
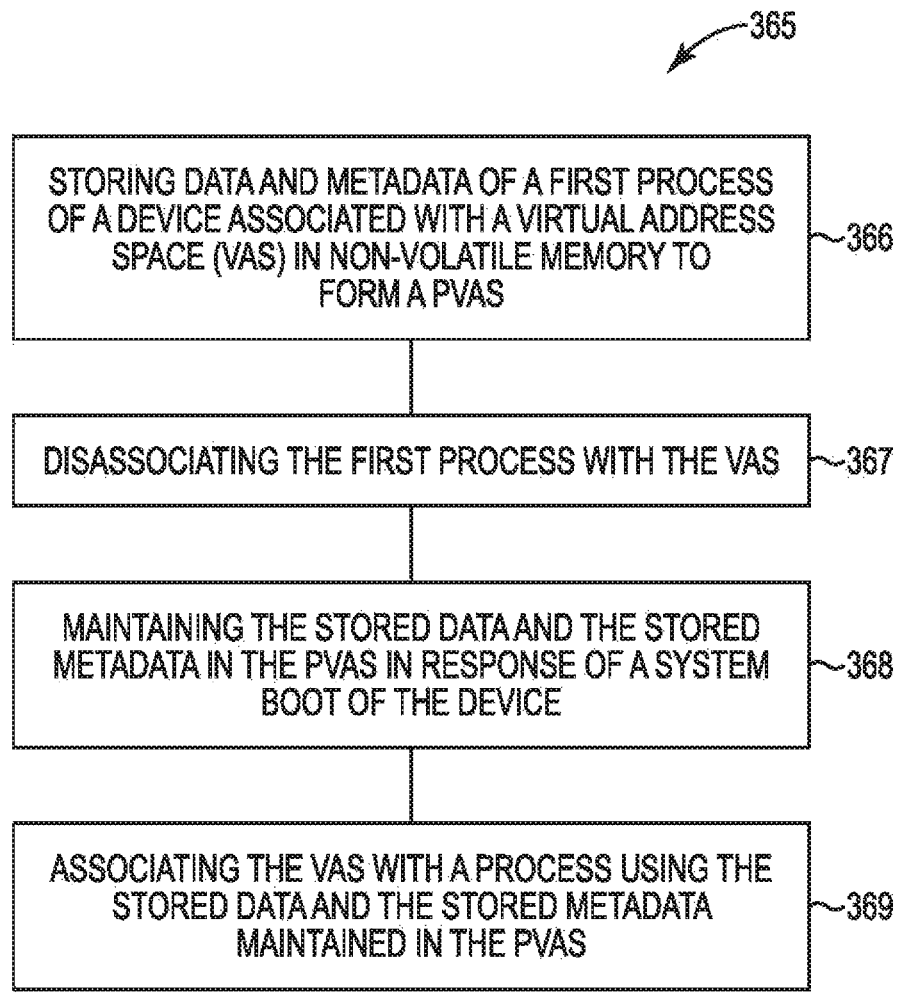
FIG. 3 is a flow chart illustrating an example of a method employing PVASs according to the disclosure.

FIG. 3 is a flow chart illustrating an example of a method 365 employing PVASs according to the disclosure. As shown at 366, the method 365 can include storing data and metadata of a first process of a device that is associated with a VAS in non-volatile memory to form a PVAS, as described herein.

As shown at 367, the method 365 can include disassociating the first process with the VAS, as described herein. The method 365 can include maintaining the stored data and the stored metadata in the PVAS across a system boot of the device, as shown at 368 and described herein.

The method 365 can include associating the VAS with a process using the stored data and the stored metadata maintained in the PVAS (e.g., a PVAS maintained in a persistent store), as shown at 369 and described herein. As used herein, a persistent store refers to non-volatile memory including a plurality of PVAS. PVASs in the persistent store can be accessed (e.g., reused), added to, compacted, and/or deleted, among other possibilities.

A PVAS can be associated with a process (e.g., a process from which it was dissociated from or a different process). In this manner, a PVAS can potentially be associated with a variety of processes though sequential association and/or dissociation of the PVAS with a number of processes. For instance, in some examples, the method 365 can include association of the first process with the VAS using the stored data and the stored metadata to efficiently re-associate the first process with the VAS using the stored data and the stored metadata. Alternatively, the method 365 can include associating a second process with the VAS using the stored data and the stored metadata. In such an example, it is noted that the second process is different than the first process referenced above.

Figure 4:
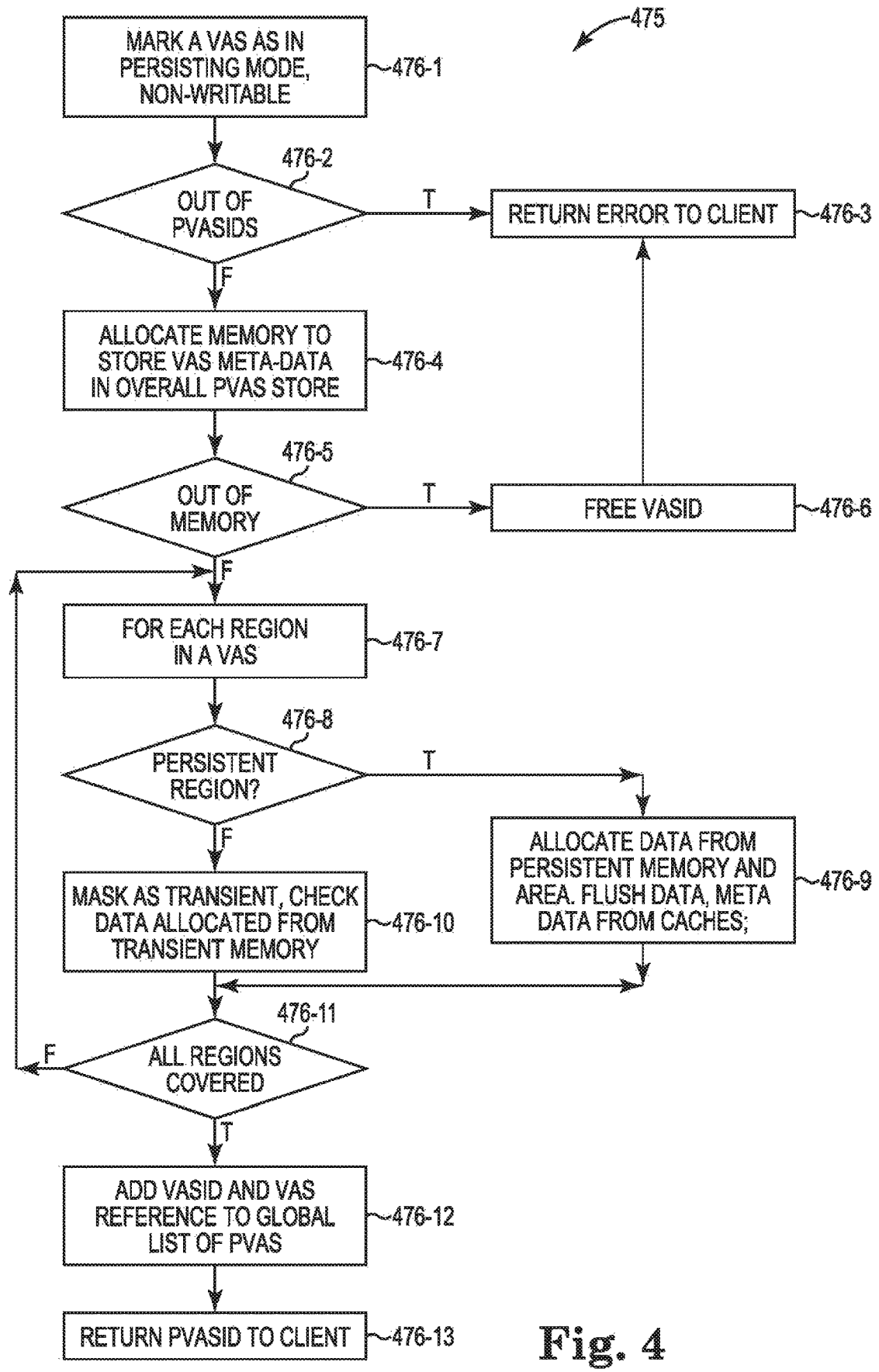
FIG. 4 is a flow chart illustrating an example of a method employing PVASs according to the disclosure.

FIG. 4 is a flow chart illustrating an example of a method 475 employing PVASs according to the disclosure. The method 475 can be employed through execution of instructions such as those described herein. The method 475 can promote formation/storage, access, and/or querying of PVASs. As illustrated at 476-1, the method 475 can include execution of instructions, such as those described herein, to mark VAS as in persisting mode. For example, a VAS can be marked as non-writable (i.e., read-only), however the disclosure is not so limited. Rather, marking in a persisting mode can include suspending changes to a VAS until a PVAS is formed, among other possibilities.

At 476-2, it can be determined whether non-volatile memory and/or other storage is out of PVASs and/or out of persistent virtual address space identification numbers (PVASID)s. When it is determined, a non-volatile memory and/or other storage storing PVASs is out of PVASIDs the method 475 can proceed to 476-3 and return an error to a client. For example, a non-volatile memory and/or other storage storing PVASs may be out of PVASIDs when each of a number of PVAS(s) is associated with a process and/or when no PVAS are formed, among other possibilities. An error can be communicated via a graphical user interface to a client, among other possibilities.

When it is determined a non-volatile memory and/or other storage is not out of PVASIDs the method 475 can proceed to 476-4 and allocate memory to store a VAS metadata (along with data, as described herein) in an overall PVAS. At 476-5 a determination can be made whether a non-volatile memory and/or other storage is out of memory. When it is determined the non-volatile memory and/or other storage is out of memory the method can proceed to 476-6 a VASID can be freed (i.e., free VASID), as described herein, along with returning an error to a client, as shown again at 476-3.

When it is determined the non-volatile memory and/or other storage is not out of memory the method can proceed to 476-7 where each region of a VAS is evaluated. A region of a VAS refers to a uniquely identified contiguous part of a VAS. For example, each region in a VAS can be evaluated to identify whether it is marked as a persistent region as shown at 476-8, among other possible evaluations. When it is determined a region is a persistent region the method can proceed to 476-9 and allocate data from the non-volatile memory (i.e., persistent memory), and flush data and metadata from caches or other storage, among other possible actions to promote PVASs. When it is determined a region is not a persistent region the method can proceed to 476-10 and mark as transient. At 476-11 the method can evaluate whether all regions are covered. If not, 476-8, 476-9, and/or 476-10 can be performed until all regions are covered.

Once each region is covered, the method can proceed to 476-12 and add a VASID and/or a VAS reference to a global list of PVASs. A global list of PVASs can be maintained in the non-volatile memory or other storage accessible by the device including the non-volatile memory. At 467-13, the method can return a PVASID to a client to promote subsequent use of a PVAS corresponding to the PVASID. For example, a client can use a PVASID to store, retrieve, query, and/or modify a PVAS, among other possible actions. In some examples, a PVASID can be used to compact PVAS such as those that may share common regions, metadata, and/or data. A PVASID can be used, in some examples, along with a threshold such a predetermined threshold time can cause a particular PVAS corresponding to a PVASID to expire (e.g., expiration via automatically deleting the PVASID from a global list of PVASs and/or deleting metadata and data of the corresponding PVAS from non-volatile memory).

Figure 5:
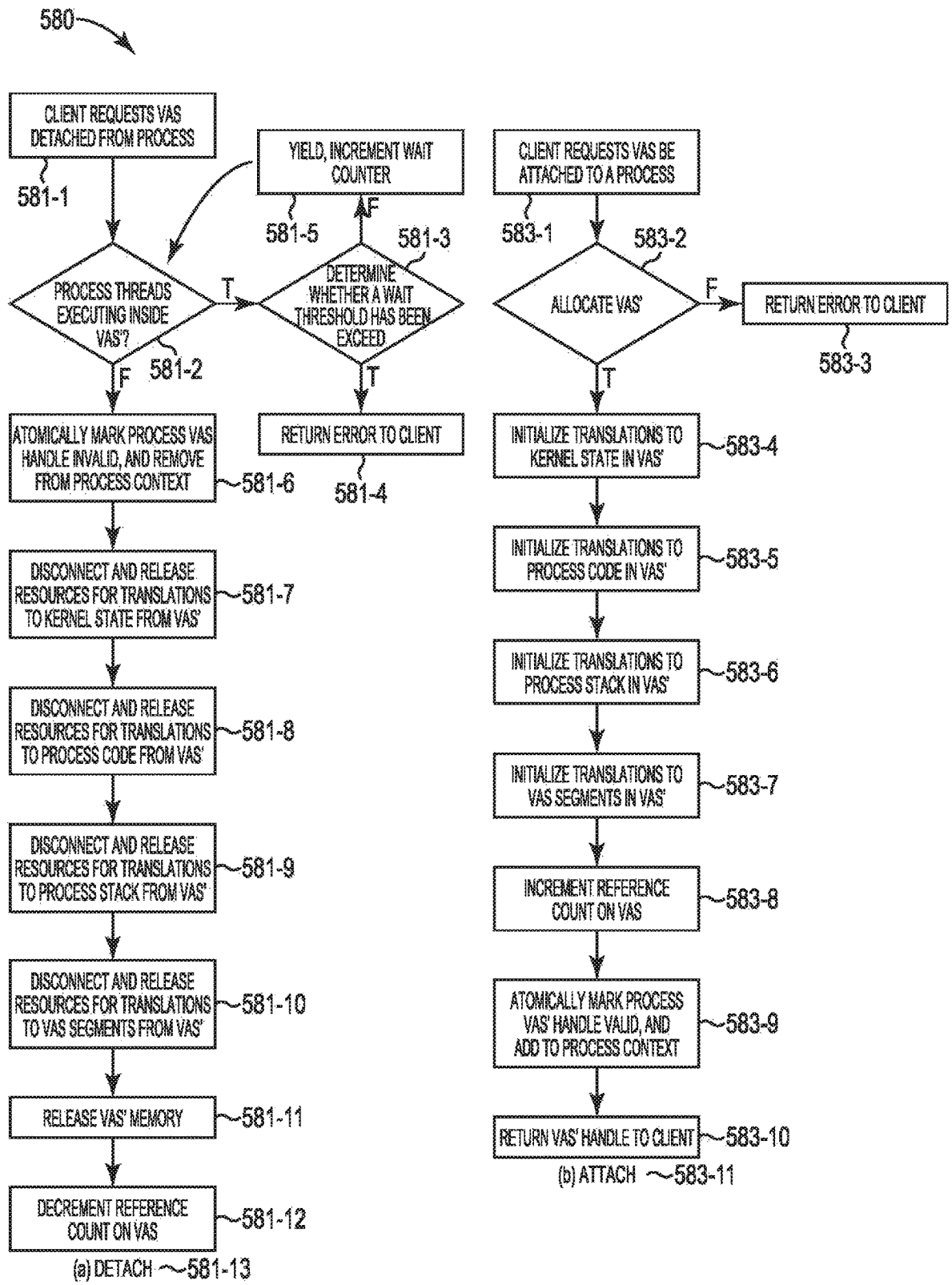
FIG. 5 is a flow chart illustrating an example of a method employing PVASs according to the disclosure.

FIG. 5 is a flow chart illustrating an example of a method employing PVASs according to the disclosure. The method 580 can be employed through execution of instructions such as those described herein. At 581-1 the method 580 can receive a request such as a client request to disassociate (i.e., detach) a VAS from a process. At 581-2, a determination can be made whether process threads are executing inside a process-specific instantiation to access the VAS (VAS'). That is, when a VAS is shared between multiple process resources may not be released as long as at least one process has a VAS attached thereto.

So, when it is determined process threads are executing inside the VAS' the method can proceed to 581-3 and determine whether a wait threshold (e.g., waiting for the threads to finish executing) has been exceed. When it is determined a wait threshold is exceeded the method can return an error to a client at 581-4. When it is determined a wait threshold is not exceeded the method can continue to yield and, in some examples, increment a wait counter than can be compared to the wait threshold as shown at 581-5.

When it is determined process threads are not executing inside the VAS' the method can proceed to 581-6 and atomically mark a process VAS handle (e.g., a PVASID of the process and/or a handle related to a PVSID of the process) invalid and remove from a process context. The method can proceed to 581-7 and disconnect and release resources from translations to kernel state from the VAS'. The method can proceed to 581-8 and disconnect and release resources from translations to process code from the VAS'. The method can proceed to 581-9 disconnect and release resources from translations to process stack form the VAS'. The method can proceed to 581-10 to disconnect and release resources from translations to VAS segments from the VAS'. The method can proceed to 581-11 and release the VAS' memory. The method can proceed to 581-12 and decrement a reference count on a VAS. It is understood that some or all of 581-1 to 581-12, among other possible acts, can be performed to detach a process from a PVAS as shown at 581-13.

FIG. 5 illustrates an example of method to attach a process to a PVAS. At 583-1 a request such as a request from a client for a VAS to be attached to a process is received. At 583-2, a determination whether a VAS' is allocated can be made. When a VAS's is not allocated an error can be returned to a client as shown at 583-3.

However, when a VAS' is allocated the method can proceed to initialize translations to kernel state in a VAS' as shown at 583-4. The method can proceed to 583-5 and initialize translations to process code in the VAS'. The method can proceed to 583-6 and initialize translations to process stack in the VAS'. The method can proceed to 583-7 and initialize translations to VAS segments in the VAS'. The method can proceed to 583-8 and increment a reference count on a VAS. The method can proceed to 583-9 and atomically mark a process VAS' handle valid and add to a process context. The method can proceed to 583-10 and return a VAS' handle to a client. It is understood that some or all of 583-1 to 583-10, among other possible acts, can be performed to attach a process to a PVAS as shown at 583-11.

Figure 6:
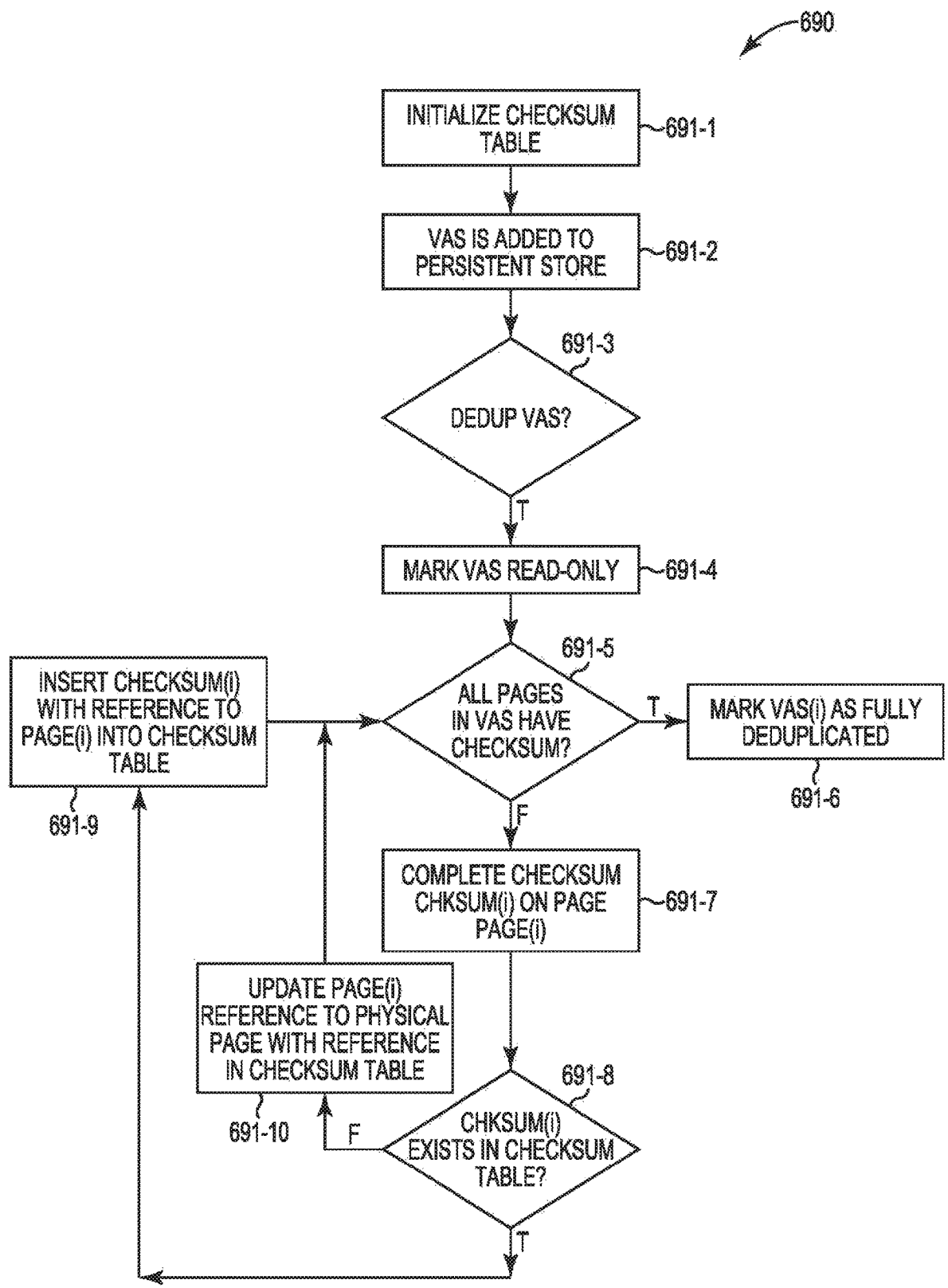
FIG. 6 is a flow chart illustrating an example of a method of compacting PVASs according to the disclosure.

As mentioned, in some examples, PVASs can be combined. FIG. 6 is a flow chart illustrating an example of a method 690 of compacting PVASs according to the disclosure. The method 690 can be employed through execution of instructions such as those described herein. The method can include initializing a checksum table as shown at 691. The checksum table can include checksums and/or other information related to PVASs and/or VASs. At 691-2 a VAS (data and/or metadata representative of the VAS) can be added to non-volatile memory. At 691-3, the method can determine whether the VAS includes duplicated information. This determination can utilize the checksum table, among other possibilities. Determining whether a VAS includes duplicated information can include comparison of information in various pages using checksums. For example, when two pages have the same checksum the pages include duplicated information, as described herein. When the PVAS does not include duplicated information, the method can be determined as complete (not shown for ease of illustration). When the PVAS includes duplicate information the method can mark the VAS read-only at 691-4 and proceed to 691-5.

At 691-5 the method can determine whether all pages in the VAS have a checksum. When all pages in the VAS have a respective checksum the method can proceed to 691-6 and mark the VAS as being deduplicated. Put another way, when all pages in the VAS have a respective checksum the VAS is deemed to be compacted.

However, when all pages in the VAS do not have a respective checksum the method can proceed to 691-7. At 691-7 the method can compute checksums (i.e., a CHKSUM) for each page in the VAS. For example, each page's checksum can be calculated using a reference hashing function (e.g., SHA-3, among other possibilities). In some examples, checksums can be stored in a separate checksum table and organized, for example, using a radix tree where leaf nodes point to the page used to compute the checksum, among other possibilities. In any case, each page in a VAS is scanned and a checksum computed thereon.

Each respective checksum is searched in the checksum table. Put another way, a determination is made whether a CHKSUM(s) exists in a checksum table, as shown at 691-8. When a checksum of a VAS page is found in a checksum table, the VAS page is released and metadata representing that VAS page instead points to the page referenced by the checksum within the tree. In this manner, VAS and/or PVAS can be compacted. When a checksum of a VAS page is not found in a checksum table, the checksum is added with a pointer to that VAS page. Put another way, the method can insert CHECKSUM(i) with reference to page(i) into the checksum table, as shown at 691-9. The method can proceed to 691-10 and update the page(i) reference with the physical page reference in checksum table. As mentioned, when all pages in the VAS have a respective checksum the method can proceed to 691-6 and mark the VAS as being deduplicated. It is understood that some or all of 691-1 to 691-10, among other possible acts, can be performed to compact VASs and/or PVAS.

As used herein, "logic" is an alternative or additional processing resource to perform a particular action and/or function, etc., described herein, which includes hardware, e.g., various forms of transistor logic, ASICs, etc., as opposed to computer executable instructions, e.g., software firmware, etc., stored in memory and executable by a processor. As used herein, "a" or "a number of" something can refer to one or more such things. When an element is referred to as being "on," "connected to", "coupled to", or "coupled with" another element, it can be directly on, connected, or coupled with the other element or intervening elements may be present.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A non-transitory processor readable medium including instructions to form a persistent virtual address space, wherein the instructions when executed by a processor cause the processor to:
   receive a whole data structure of a virtual address space (VAS) associated with a first process, wherein the whole data structure includes data and metadata of the VAS;
   store the data and the metadata of the VAS in a non-volatile memory to form a persistent VAS (PVAS);
   disassociate the VAS from the first process; and
   maintain the stored data and the stored metadata in the PVAS in response to the disassociation of the VAS from the first process; and
   associating VAS with a second process using the stored data and the stored metadata maintained in the PVAS, wherein the second process uses the stored data and the metadata, and wherein the second process is different than the first process.

2. The medium of claim 1, including instructions to receive second metadata that includes virtual address mappings of the first process to a page.

3. The medium of claim 1, including instructions to store the PVAS along with a plurality of PVAS to form a persistent store.

4. The medium of claim 1, including instructions to use the stored data and the stored metadata to associate the first process with the PVAS.

5. The medium of claim 1, wherein the instructions to receive include instructions to receive the whole data structure of the VAS that includes the data and the stored metadata of the VAS from volatile memory.

6. A device comprising:
a non-volatile memory;
a first process executing on a processor;
a virtual memory system including a plurality of virtual address spaces (VASs), wherein a virtual address space (VAS) of the plurality of VASs is associated with the first process; and
a non-transitory processor readable medium including instructions executable by the processor to store a whole data structure of the VAS in the non-volatile memory to form a persistent VAS (PVAS) maintained in the non-volatile memory in response to powering off the device,
wherein the VAS is associated with a second process using stored data and stored metadata maintained in the PVAS, wherein the second process uses the stored data and the stored metadata, and wherein the second process is different than the first process.

7. The device of claim 6, wherein the PVAS is included in a plurality of PVASs, wherein each of the plurality of PVASs includes a respective whole data structure of a VAS that remains in the non-volatile memory across a system boot.

8. The device of claim 7, including instructions to delete the PVAS of the plurality of PVASs in response to the PVAS reaching a predetermined threshold time.

9. The device of claim 6, including instructions to deduplicate the VAS of the plurality of VASs.

10. The device of claim 6, wherein the whole data structure includes pages, translation structures, data, and description information of the VAS.

11. A method comprising: storing data and metadata of a virtual address space (VAS) associated with a first process of a device in non-volatile memory to form a persistent VAS (PVAS);
disassociating the VAS from the first process;
maintaining the stored data and the stored metadata in the PVAS across a system boot of the device;
associating the VAS with a second process using the stored data and the stored metadata maintained in the PVAS, wherein the second process uses the stored data and the stored metadata, and wherein the second process is different than the first process.

12. The method of claim 11, wherein associating comprises re-associating the VAS with the first process using the stored data and the stored metadata.

13. The medium of claim 1, wherein the PVAS is included in a plurality of PVASs, and wherein each of the plurality of PVASs includes a respective whole data structure of the VAS that remains in the non-volatile memory across a device boot.

14. The medium of claim 1, including instructions to associate the PVAS to a persistent virtual address space identification numbers (PVASID) and update the PVASID to expire when the process will terminate.

* * * * *